United States Defensive Publication [19] (H) [11] T960,004

Neville [43] July 5, 1977

[54] APPARATUS FOR CONCURRENT MEASUREMENT OF POLYMER MELT

[76] Inventor: Garth Emanuel Neville, 307 Brandywine Drive, Old Hickory, Tenn. 37138

[21] Appl. No.: 690,313

[22] Filed: May 26, 1976

Related U.S. Application Data

[63] Continuation of Ser. No. 469,838, May 14, 1974, abandoned.

[51] Int. Cl.[2] ..... G01N 11/04

[52] U.S. Cl. ..... 73/55

[57] ABSTRACT

A polymer melt's rheological properties are comprehensively described by defining the constants K and $n$ in the rheological equation: $T = KG^n$ where T = shear stress and G = shear rate. The constants are determined by a rheometer which divides a molten polymer sample into two streams pumped by positive displacement pumps having identical speed-displacement characteristics past pressure transducers and finally through dissimilar capillaries to atmosphere. The pressure in each line is regulated at a predetermined level. Pressure and tachometer readings are used to compute the constants K and $n$.

3 Claims, 1 Sheet Drawing,

12 Pages Specification

The file of this unexamined application may be inspected and copies thereof may be purchased (849 O.G. 1221, Apr. 9, 1968).

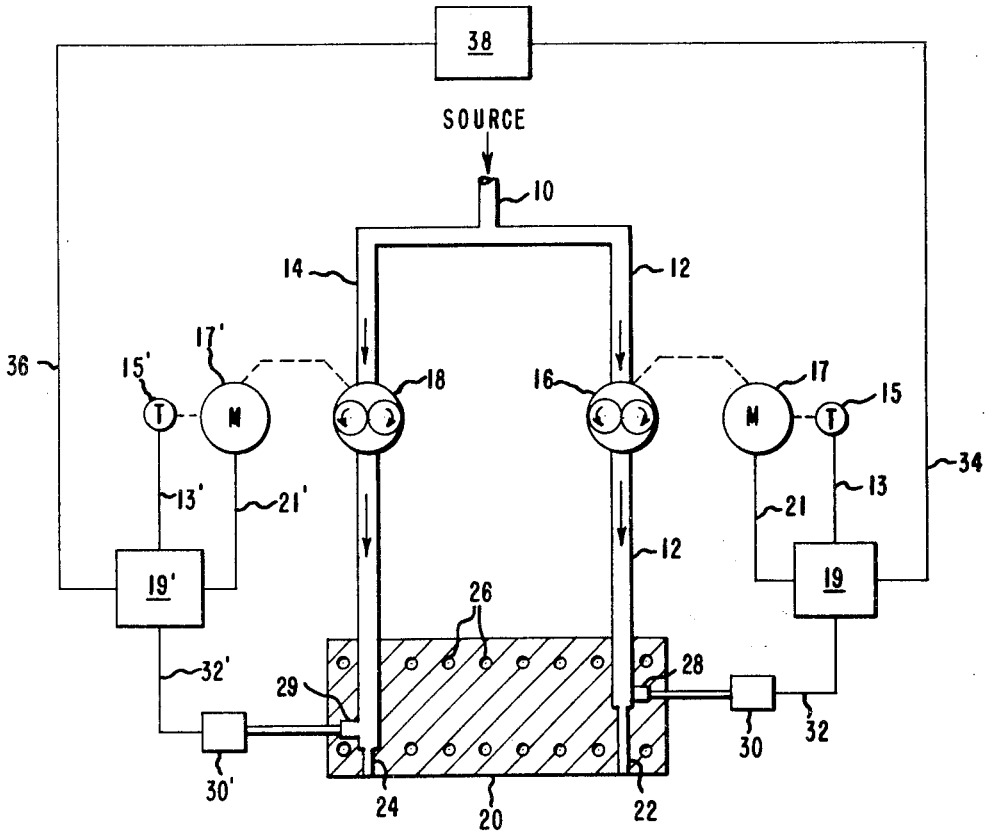

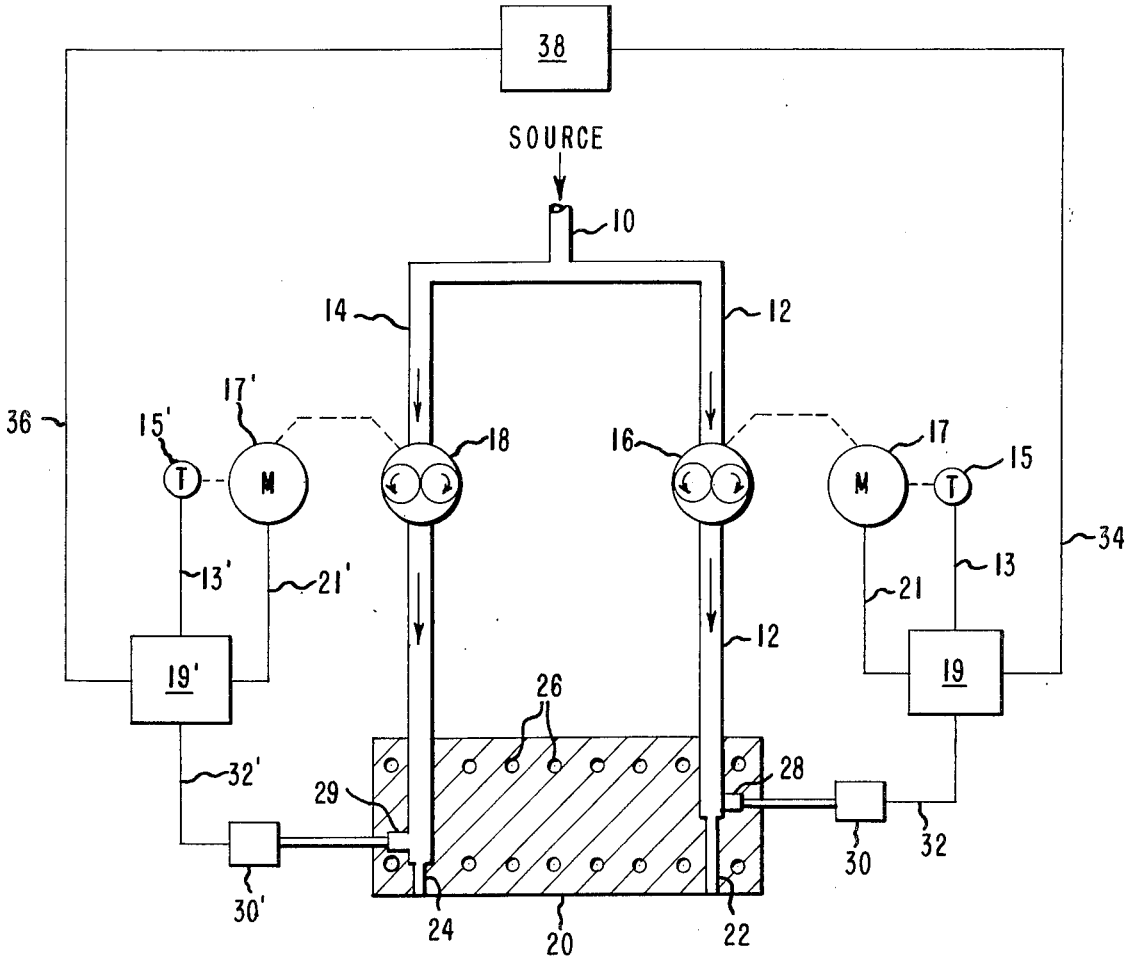
38
SOURCE
10
14
12
36
15'
17'
T
M
18
16
17
15
T
M
34
13'
21'
13
21
12
19'
19
26
32'
29
28
30'
24
20
22
30
32